United States Patent
Park et al.

(10) Patent No.: US 9,112,221 B2
(45) Date of Patent: Aug. 18, 2015

(54) COMPOSITE ANODE ACTIVE MATERIAL, ANODE AND LITHIUM BATTERY COMPRISING THE MATERIAL, AND METHOD OF PREPARING THE SAME

(71) Applicant: Samsung SDI Co., Ltd., Yongin-si, Gyeonggi-do (KR)

(72) Inventors: Sang-Eun Park, Yongin-si (KR); Jae-Myung Kim, Yongin-si (KR); So-Ra Lee, Yongin-si (KR); Ui-Song Do, Yongin-si (KR); Chang-Su Shin, Yongin-si (KR); Yu-Jeong Cho, Yongin-si (KR); Su-Kyung Lee, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 151 days.

(21) Appl. No.: 13/759,887

(22) Filed: Feb. 5, 2013

(65) Prior Publication Data

US 2014/0050984 A1    Feb. 20, 2014

Related U.S. Application Data

(60) Provisional application No. 61/683,040, filed on Aug. 14, 2012.

(51) Int. Cl.
| | |
|---|---|
| *H01M 4/583* | (2010.01) |
| *H01M 4/38* | (2006.01) |
| *H01M 4/36* | (2006.01) |

(Continued)

(52) U.S. Cl.
CPC .............. *H01M 4/362* (2013.01); *H01M 4/366* (2013.01); *H01M 4/38* (2013.01); *H01M 4/386* (2013.01); *H01M 4/387* (2013.01); *H01M 4/587* (2013.01); *H01M 10/0525* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2006/0134516 A1* | 6/2006 | Im et al. ..................... | 429/218.1 |
| 2006/0147797 A1 | 7/2006 | Wu et al. | |

(Continued)

FOREIGN PATENT DOCUMENTS

| | | |
|---|---|---|
| KR | 10-2004-0082803 A | 9/2004 |
| KR | 10-2011-0025693 A | 3/2011 |

(Continued)

OTHER PUBLICATIONS

European Extended Search Report dated Nov. 25, 2013 for European Patent Application No. EP 13 155 064.2 which claims priority from U.S. Appl. No. 61/683,040, filed Aug. 14, 2012, and captioned U.S. Appl. No. 13/759,887.

*Primary Examiner* — Cynthia K Walls
(74) *Attorney, Agent, or Firm* — Knobbe Martens Olson & Bear LLP

(57) ABSTRACT

A composite anode active material, an anode and a lithium battery each including the composite anode active material, and a method of preparing the composite anode active material. The composite anode active material includes a composite core, and a coating layer covering at least a region of the composite core, wherein the composite core includes a carbonaceous substrate and a metal/semi-metal nanostructure on the carbonaceous substrate, the coating layer is more predominant on the nanostructure than on the carbonaceous substrate, and the coating layer includes a metal oxide.

13 Claims, 4 Drawing Sheets

(51) Int. Cl.
*H01M 4/587* (2010.01)
*H01M 10/0525* (2010.01)

(56) References Cited

U.S. PATENT DOCUMENTS

| | | | |
|---|---|---|---|
| 2008/0003503 A1 | 1/2008 | Kawakami et al. | |
| 2010/0051925 A1 | 3/2010 | Kho et al. | |
| 2010/0297502 A1 | 11/2010 | Zhu et al. | |
| 2011/0083737 A1 | 4/2011 | Nishino et al. | |
| 2011/0086271 A1 | 4/2011 | Lee et al. | |
| 2012/0135303 A1* | 5/2012 | Hong et al. | 429/211 |

FOREIGN PATENT DOCUMENTS

| | | |
|---|---|---|
| KR | 10-2011-0040478 A | 4/2011 |
| KR | 10-2011-0049629 A | 5/2011 |
| KR | 10-2012-0089512 A | 8/2012 |
| WO | WO 2010/138617 A2 | 12/2010 |
| WO | WO 2012/071914 A1 | 6/2012 |

* cited by examiner

COMPOSITE ANODE ACTIVE MATERIAL, ANODE AND LITHIUM BATTERY COMPRISING THE MATERIAL, AND METHOD OF PREPARING THE SAME

CROSS-REFERENCE TO RELATED APPLICATION

This application claims the benefit of U.S. Provisional Application No. 61/683,040 filed Aug. 14, 2012, the disclosure of which is incorporated in its entirety herein by reference.

BACKGROUND

1. Field

One or more embodiments of the present disclosure relate to a composite anode active material, an anode and a lithium battery each including the composite anode active material, and a method of preparing the composite anode active material.

2. Description of the Related Technology

Lithium batteries have high voltage and high energy density, and thus are used in various applications. Devices such as electric vehicles (HEV, PHEV), and the like should be operable at high temperatures, be able to charge or discharge a large amount of electricity, and have long-term usability, and thus require lithium batteries having high-discharge capacity and better lifetime characteristics.

Carbonaceous materials are porous and stable with little volumetric change during charging and discharging. However, carbonaceous materials may lead to a low-battery capacity due to the porous structure of carbon. For example, graphite, which is an ultra-high crystalline material, has a theoretical capacity density of about 372 mAh/g when made into a structure in the form of $LiC_6$.

In addition, metals that are alloyable with lithium may be used as anode active materials with high electric capacity relative to carbonaceous materials. Examples of the metals that are alloyable with lithium are silicon (Si), tin (Sn), and aluminum (Al). However, these metals alloyable with lithium are apt to degrade, and thus may have relatively low life-time characteristics. For example, with repeated charging or discharging, aggregation and crushing of Si particles may be repeated, and thus are electrically shorted.

Therefore, there is a demand for lithium batteries with improved discharge capacity and lifetime characteristics.

SUMMARY

One or more embodiments of the present disclosure include a novel composite anode active material that contains a metal oxide selectively disposed on a composite core, and a lithium battery including the composite anode active material.

According to an embodiment of the present disclosure, there is provided a composite anode active material including a composite core, and a coating layer covering at least a part of the surface of the composite core, wherein the composite core includes a carbonaceous substrate and a nanostructure on the carbonaceous substrate, the coating layer is more predominant on the nanostructure than on the carbonaceous substrate, and the coating layer includes a metal oxide. In some embodiments, the nanostructure includes a metal/semi-metal.

According to another embodiment of the present disclosure, there is provided an anode including the composite anode active material.

According to another embodiment of the present disclosure, there is provided a lithium battery including the anode.

According to another embodiment of the present disclosure, there is provided a method of preparing the composite anode active material, including: mixing a composite material, a catalyst, and a solvent to prepare a first solution; mixing a metal alkoxide and a solvent to prepare a second solution; dropwise adding the second solution to the first solution while stifling the first solution to prepare a mixed solution; washing and drying the mixed solution to obtain a dried product; and heating the dried product, wherein the composite material includes a carbonaceous substrate; and a nanostructure disposed on the substrate. In some embodiments, the nanostructure includes a metal/semi-metal.

As described above, according to the one or more embodiments of the present disclosure, using the composite anode active material including a metal oxide selectively disposed on the composite core, a lithium battery may have improved discharge capacity and lifetime characteristics.

Some embodiments provide a composite anode active material comprising: a composite core, wherein said composite core comprises a carbonaceous substrate and a nanostructure on the carbonaceous substrate; and a coating layer formed on the composite core, wherein said coating layer comprises a metal oxide, the coating layer on the nanostructure may be thicker than that on the carbonaceous substrate.

In certain embodiments, the nanostructure includes a metal/semi-metal (A) and the metal oxide includes a metal (B), and a ratio (A/B) of the metal/semi-metal atomic % of the nanostructure to the metal atomic % (B) of the metal oxide, which may be obtained by energy-dispersive X-ray spectroscopy (EDAX), is about 20 or less.

In certain embodiments, the nanostructure comprises at least one component selected from the group consisting of nanowires, nanotubes, nanobelts, nanorods, a nanoporous body, and nanotemplates.

In certain embodiments, the nanostructure comprises an element selected from the group consisting of aluminum (Al), gallium (Ga), indium (In), thallium (Tl), silicon (Si), germanium (Ge), tin (Sn), lead (Pb), antimony (Sb), and bismuth (Bi).

In certain embodiments, the nanostructure comprises silicon-based nanowires, nanotubes, nanobelts, nanorods, nanoporous body, or nanotemplates.

In certain embodiments, the nanostructure comprises silicon-based nanowires.

In certain embodiments, the carbonaceous substrate comprises at least one component selected from the group consisting of natural graphite, artificial graphite, expanded graphite, graphene, carbon black, and fullerene soot.

In certain embodiments, the carbonaceous substrate may be natural graphite.

In certain embodiments, the natural graphite may be spherical graphite.

In certain embodiments, the metal oxide comprises at least one metal selected from the group consisting of magnesium (Mg), aluminum (Al), cobalt (Co), potassium (K), sodium (Na), calcium (Ca), titanium (Ti), vanadium (V), tin (Sn), germanium (Ge), gallium (Ga), boron (B), arsenic (As), and zirconium (Zr).

In certain embodiments, the metal oxide may be one or more components selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide.

In certain embodiments, the metal oxide may be $TiO_2$, $Al_2O_3$, or $ZrO_2$.

Some embodiments provide a lithium battery comprising:
a cathode;
an anode, said anode including a composite anode active material, said composite anode active material including a composite core, wherein said composite core includes a carbonaceous substrate and a nanostructure on the carbonaceous substrate;
a coating layer formed on the composite core, wherein said coating layer includes a metal oxide, and the coating layer on the nanostructure may be thicker than that on the carbonaceous substrate; and
a separator disposed between the anode and the cathode.

Some embodiments provide a method of preparing a composite anode active material, comprising:
forming a nanostructure on a carbonaceous substrate to provide component A;
mixing component A, a catalyst and a first solvent to provide a first mixture;
mixing a metal alkoxide and a second solvent to provide a second mixture;
dropwise adding the second mixture to the first mixture while stifling the first mixture to provide a third mixture;
processing the third mixture to provide a composite anode active material precursor, wherein processing the third mixture comprises removing the first solvent and second solvent from the third mixture; and
sintering the composite anode active material precursor to provide a composite anode active material.

In certain embodiments, the metal alkoxide may be a compound having the structure:

$M(OR)_x$, where:
x may be 1, 2, 3, 4, or 5;
M may be selected from the group consisting of Zr, Ni, Co, Mn, B, Mg, Ca, Sr, Ba, Ti, V, Fe, Cu, and Al; and
R may be $C_{1-10}$ alkyl.

In certain embodiments, the metal alkoxide may be titanium isopropoxide, or aluminum isopropoxide.

In certain embodiments, the catalyst may be selected from the group consisting of KOH, NaOH, LiOH, $NH_4OH$, and $Ca(OH)_2$.

In certain embodiments, a weight ratio of the metal alkoxide to the component A in the third mixture is from about 0.1:100 to about 20:100.

In certain embodiments, the sintering may be performed in a nitrogen or air atmosphere at a temperature of from about 400° C. to about 900° C. for from about 8 hours to about 15 hours. In certain embodiments, the sintering may be performed in a nitrogen or air atmosphere at a temperature of from about 500° C. to about 700° C. for from about 8 hours to about 15 hours.

In certain embodiments, the ratio of coating layer thickness (A) on the nanostructure and the coating layer thickness (B) on the carbonaceous substrate may be greater than 1 to about 100 (A/B). In certain embodiments, the ratio of coating layer thickness (A) on the nanostructure and the coating layer thickness (B) on the carbonaceous substrate may be greater than 1 to about 1000 (A/B). In certain embodiments, the ratio of coating layer thickness (A) on the nanostructure and the coating layer thickness (B) on the carbonaceous substrate may be greater than 2 to about 100 (A/B). In certain embodiments, the ratio of coating layer thickness (A) on the nanostructure and the coating layer thickness (B) on the carbonaceous substrate may be greater than 3 to about 50 (A/B). In certain embodiments, the ratio of coating layer thickness (A) on the nanostructure and the coating layer thickness (B) on the carbonaceous substrate may be greater than 4 to about 25 (A/B).

REFERENCE NUMERALS DESIGNATING THE MAJOR ELEMENTS OF THE DRAWINGS

Figure 1:
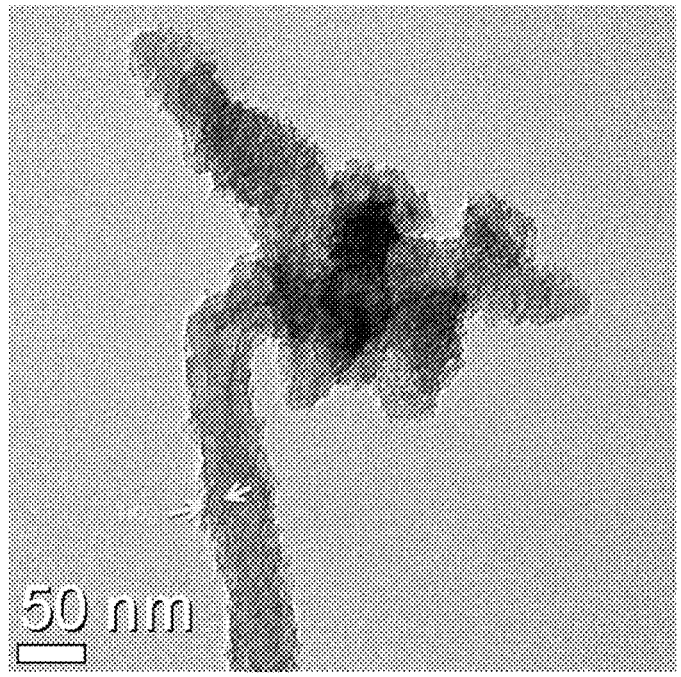
FIG. 1 is a transmission electron microscopic (TEM) image of a composite anode active material prepared in Example 1.

1: lithium battery
2: anode
3: cathode
4: separator
5: battery case
6: cap assembly

DETAILED DESCRIPTION

Hereinafter, one or more embodiments of a composite cathode active material, an anode and a lithium battery each including the composite cathode active material, and a method of preparing the composite anode active material will be described in greater detail.

According to an embodiment of the present disclosure, a composite anode active material includes a composite core, and a coating layer disposed in at least a part on the surface of the composite core, wherein the composite core includes a carbonaceous substrate and a nanostructure on the carbonaceous substrate, the coating layer may be disposed more on the nanostructure than on the carbonaceous substrate, and the coating layer includes a metal oxide. In some embodiments, the nanostructure includes a metal/semi-metal. In some embodiments, the thickness of coating layer is from about 5 nm to about 10 nm on the nanostructure and the thickness of coating layer is from about 15 nm to about 100 nm on the carbonaceous substrate. In some embodiments, the average thickness of coating layer is from about 1 nm to about 50 nm on the nanostructure and the average thickness of coating layer is from about 25 nm to about 100 nm on the carbonaceous substrate where the ratio of the average thickness of coating layer on the nanostructure to the average thickness of coating layer on the carbonaceous substrate is greater than 1 to about 100.

Due to the inclusion of the metal oxide on the composite core, the composite anode active material may prevent a side reaction between the composite core and an electrolyte solution, and may improve lifetime characteristics when used in a lithium battery. In some embodiments, the nanostructure may further improve discharge capacity. In some embodiments, the coating layer including the metal oxide may be a protective layer for the composite core. In some embodiments, the nanostructure includes a metal/semi-metal.

In the composite anode material the coating layer may be mainly disposed on the nanostructure than on the carbonaceous substrate. In some embodiments, the coating layer disposed on the nanostructure may effectively prevent the nanostructure that undergoes a great volumetric change during charging/discharging from contacting the electrolyte solution, so that a lithium battery including the composite anode active material may have improved lifetime characteristics. In some embodiments, the nanostructure includes a metal/semi-metal.

For example, in the above-mentioned composite anode active material with the metal oxide coating layer mainly disposed on the nanostructure, the surface of the nanostructure may be more stable enough not to be vulnerable to a side reaction with the electrolyte solution under harsh conditions, such as at high temperatures, providing relatively improved lifetime characteristics, in comparison with the composite anode active material with the metal oxide coating layer uniformly distributed on the carbonaceous base and the metal/semi-metal nanostructure. In some embodiments, the nanostructure includes a metal/semi-metal.

In some embodiments, the coating layer of the composite anode active material present on the nanostructure may be about 70 wt % or more based on a total weight of the coating layer on the composite anode active material. In some other embodiments, the coating layer of the composite anode active material present on the nanostructure may be about 90 wt % or more based on a total weight of the coating layer on the composite anode active material. In still other embodiments, the coating layer of the composite anode active material present on the nanostructure may be about 99 wt % or more based on a total weight of the coating layer on the composite anode active material. In some embodiments, the coating layer of the composite anode active material present on the carbonaceous substrate may be about 30 wt % or less based on a total weight of the coating layer on the composite anode active material. In some embodiments, the coating layer of the composite anode active material present on the carbonaceous substrate may be about 10 wt % or less based on a total weight of the coating layer on the composite anode active material. In some embodiments, the coating layer of the composite anode active material present on the carbonaceous substrate may be about 1 wt % or less based on a total weight of the coating layer on the composite anode active material. In some embodiments, the nanostructure includes a metal/semi-metal.

In some embodiments, the coating layer of the composite anode active material present on the nanostructure may be thicker than the coating layer present on the carbonaceous substrate. In some embodiments, the coating layer present on the nanostructure may be about 50% or greater thicker than the coating layer present on the carbonaceous substrate. In some other embodiments, the coating layer present on the nanostructure may be about 100% or greater thicker than the coating layer present on the carbonaceous substrate. In some other embodiments, the thickness of the coating layer present on the nanostructure may be double or greater than the thickness of the coating layer present on the carbonaceous substrate. In still other embodiments, the coating layer present on the nanostructure may be about 200% or greater thicker than the coating layer present on the carbonaceous substrate In some other embodiments, the thickness of the coating layer present on the nanostructure may be triple or greater than the thickness of the coating layer present on the carbonaceous substrate.

In some embodiments, the coating layer of the composite anode active material may be present only on the nanostructure, and not on the carbonaceous substrate. In some embodiments, the coating layer of the composite anode active material may be essentially present only on the nanostructure, not on the carbonaceous substrate. For example, from about 95% to about 99% of the coating layer may be present on the nanostructure. In some embodiments, the coating layer of the composite anode active material may be selectively present only on the nanostructure in order to prevent conductivity from being reduced due to the metal oxide coating layer present on the carbonaceous substrate. In some embodiments, a lithium battery including a composite anode active material as disclosed and described herein may have improved lifetime characteristics as compared with when using a composite anode active material of which coating layer is additionally present on the carbonaceous substrate. In some embodiments, the nanostructure includes a metal/semi-metal.

In the composite anode active material a ratio (A/B) of the metal/semi-metal atomic % of the nanostructure to the metal atomic % (B) of the metal oxide, which are obtained by energy-dispersive X-ray spectroscopy (EDAX), may be about 20 or less. The metal/semi-metal atomic % (A) in the nanostructure and the metal atomic % in the metal oxide (B) may be calculated from peak intensities of the EDAX spectra. In some embodiments, the composite anode active material a ratio (A/B) of the metal/semi-metal atomic % of the nanostructure to the metal atomic % (B) of the metal oxide may be about 15 to about 1%. In some embodiments, the composite anode active material a ratio (A/B) of the metal/semi-metal atomic % of the nanostructure to the metal atomic % (B) of the metal oxide may be about 10 to about 1%. In some embodiments, the composite anode active material a ratio (A/B) of the metal/semi-metal atomic % of the nanostructure to the metal atomic % (B) of the metal oxide may be about 5 to about 1%.

In some embodiments, a ratio (A/B) of the metal/semi-metal atomic % of the nanostructure in the composite anode active material to the metal atomic % (B) of the metal oxide, which are obtained by EDAX, may be about 10 or less. In some other embodiments, a ratio (A/B) of the metal/semi-metal atomic % of the nanostructure in the composite anode active material to the metal atomic % (B) of the metal oxide, which are obtained by EDAX, may be about 5 or less.

In some embodiments, the metal in the metal oxide may be at least one selected from among the elements of Groups 2 to 13 of the periodic table of elements. In other words, the metal in the metal oxide excludes the elements of Group 1 and Groups 14 to 16 of the periodic table of elements.

For example, the metal of the metal oxide may be at least one selected from the group consisting of zirconium (Zr), nickel (Ni), cobalt (Co), manganese (Mn), boron (B), magnesium (Mg), calcium (Ca), strontium (Sr), barium (Ba), titanium (Ti), vanadium (V), iron (Fe), copper (Cu), and aluminum (Al).

In some embodiments, the metal oxide may be represented by Formula 1 below:

$$M_aO_b \qquad \text{Formula 1}$$

In Formula 1 above, $1 \le a \le 4$, $1 \le b \le 10$, and M may be at least one element selected from the group consisting of Zr, Ni, Co, Mn, B, Mg, Ca, Sr, Ba, Ti, V, Fe, Cu, and Al.

In some other embodiments, the metal oxide may include at least one component selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide. For example, the metal oxide may be $TiO_2$, $Al_2O_3$, or $ZrO_2$.

In some embodiments, the metal oxide may be inert to lithium. In some embodiments, the metal oxide may not react with lithium to form a lithium metal oxide. In some embodiments, the metal oxide may serve as a conductor for mere transmission of lithium ions and/or electrons and a protective layer for preventing side reactions with an electrolyte solution, not as an anode active material allowing intercalation/deintercalation of lithium. In some embodiments, the metal oxide may serve as an electric insulator and a protective layer for preventing side reactions with the electrolyte solution.

In some embodiments, an amount of the metal oxide in the composite anode active material may be from about 0.1 wt % to about 20 wt % based on a total weight of the composite anode active material. In some other embodiments, the amount of the metal oxide may be from about 0.1 wt % to about 10 wt % based on the total weight of the composite anode active material. In some embodiments, a coating effect of the metal oxide may be negligible when the amount of the metal oxide is too low. When the amount of the metal oxide is too high, this may lead to reduced specific capacity.

In some embodiments, the inclusion of the nanostructure in the composite anode active material may make it easier to absorb a volumetric change of the nanostructure during charging/discharging, preventing degradation of a lithium battery. As a result, the lithium battery may have improved discharge capacity and lifetime characteristics.

In some embodiments, the nanostructure in the composite anode active material may be formed as at least one selected from the group consisting of nanowires, nanotubes, nanobelts, nanorods, nanoporous body, and nanotemplates, but is not limited thereto. In some embodiments, the nanostructure may have any of a variety of structures on a nanoscale excluding nanoparticles.

In some embodiments, the nanostructure may be a nanowire.

As used herein, the term "nanowire" refers to a wire structure having a cross-sectional diameter on a nanometer scale. For example, the nanowire may have a cross-sectional diameter of from about 1 nm to about 500 nm, and a length of from about 0.1 µm to about 100 µm. In some embodiments, the nanowire may have an aspect ratio of from about 5 or greater, about 10 or greater, about 50 or greater, or about 100 or greater. The nanowire may have a substantially constant diameter or a varying diameter. The major axis of the nanowire may be at least partially straight, curved, bent, or branched. In some embodiments, the nanostructure includes a metal/semi-metal. The nanowire may effectively absorb a volumetric change of metal/semi-metal in association with charging/discharging of the lithium battery.

In some embodiments, the nanostructure of the composite anode active material may include at least one element selected from the group consisting of the elements of Groups 13, 14, and 15 of the periodic table of elements. In some embodiments, the nanostructure includes a metal/semi-metal.

As used herein, the term "metal/semi-metal" refers to an element capable of intercalating and deintercalating lithium, and that may be classified as a metal and/or a semi-metal in the periodic table of elements, wherein carbon is excluded. In some embodiments, the metal/semi-metal nanostructure may include an element selected from the group consisting of aluminum (Al), gallium (Ga), indium (In), thallium (Tl), silicon (Si), germanium (Ge), tin (Sn), lead (Pb), antimony (Sb), bismuth (Bi), and a combination thereof.

In some other embodiments, the metal/semi-metal nanostructure may include at least one element selected from the group consisting of Si, Ge, and Sn.

In some embodiments, the nanostructure may be a silicon-based nanowire.

As used herein, the term "silicon-based" refers to the inclusion of about 50 wt % or greater of silicon (Si), for example, at least about 60 wt %, about 70 wt %, about 80 wt %, about 90 wt %, or about 100 wt % of Si. In some embodiments, the silicon-based nanowire may be any of a variety of silicon-based materials, for example, a material selected from among Si, $SiO_x$ (0<x≤2), a Si—Z alloy (wherein Z is an alkali metal, an alkali earth metal, a Group 13 element, a Group 14 element, a transition metal, a rare-earth metal, or a combination thereof; and is not Si), and a combination thereof. The element Z may be selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. In some embodiments, the silicon-based material, such as Si, $SiO_x$, or a Si—Z alloy, may be an amorphous silicon, a crystalline silicon (either monocrystalline or polycrystalline), or a combination thereof. These silicon-based nanowires may be used alone or in a combination of at least two thereof. For example, the silicon-based nanowire may be a Si nanowire in terms of high capacity. In some embodiments, the Si nanowire may further include a dopant in order to improve conductivity. For example, the dopant may be a Group 13 element or a Group 15 element. For example, the dopant may be P (phosphorus), B (boron), or the like.

In some embodiments, the nanostructure of the composite core may be a Si nanowire. In some embodiments, the Si nanowire of the composite core may be prepared by directly growing Si nanowires on a carbonaceous substrate, or by arranging previously grown Si nanowires to a carbonaceous substrate by attaching or binding the same to the carbonaceous substrate. The method of arranging the Si nanowire onto the carbonaceous substrate is not particularly limited, and may be any of widely known methods. For example, the Si nanowire may be grown using a vapor-liquid-solid (VLS) growing method, or by using a nano-sized catalyst for thermally decomposing a precursor gas near the catalyst. In some embodiments, a metal catalyst may be present or not when the Si-nanowire is directly grown on a carbonaceous substrate. Examples of the metal catalyst are Pt, Fe, Ni, Co, Au, Ag, Cu, Zn, and Cd.

In some embodiments, an amount of the carbonaceous substrate in the composite core may be from about 60 wt % to about 99 wt %. In some embodiments, an amount of the silicon-based nanowire may be from about 1 wt % to about 40 wt %.

In some embodiments, the carbonaceous substrate of the composite core may have a spherical shape or a planar shape. If the carbonaceous substrate is spherical, it may have a sphericity of from about 0.7 to about 1.0. Sphericity is a measure of a degree of deviation from a right sphere, which may range from about 0 to 1. The nearer to the number 1, the closer to the ideal sphere. For example, the carbonaceous base may have a sphericity of from about 0.8 to about 1.0. In some embodiments, the carbonaceous substrate may have a sphericity of from about 0.9 to about 1.0. In some embodiments, a planar carbonaceous substrate may have a sphericity of about less than 0.7.

In some embodiments, the carbonaceous substrate may include at least one component selected from the group consisting of natural graphite, artificial graphite, expanded graphite, graphene, carbon black, and fullerene soot, but is not limited thereto, and may be any carbonaceous substrate available in the art. Examples of the natural graphite, are flak graphite, high-crystalline graphite, and amorphous graphite. Examples of the artificial graphite, which is artificially synthesized by heating amorphous carbon at a high temperature, are primary graphite, electrographite, secondary graphite, and graphite fiber. The expandable graphite is a graphite with vertically expanded molecular layer obtained by intercalating a chemical such as acid or alkali between the molecular layers of the graphite and heating the same. The graphene is a single-layered graphene. The carbon black is a crystalline material less ordered as compared with graphite. The carbon black may change into graphite if heated at about 3,000° C. for a long time. The fullerene soot is a carbon mixture including at least 3 wt % of fullerene as a polyhedral bundle compound having 60 or more carbon atoms. In some embodiments, the carbonaceous base may include one of these crystalline carbonaceous materials alone or at least two thereof. For example, the natural graphite may be used in order to obtain an anode active material composition with a higher density in preparing an anode.

An average particle diameter of the carbonaceous substrate is not particularly limited. If the average particle diameter of the carbonaceous substrate is too small, reactivity with the electrolyte solution is so high to lower cycling characteristics. If the average particle size is too large, an anode slurry may have lower dispersion stability, so that the anode may have a rough surface. In some embodiments, the carbonaceous substrate may have an average particle diameter of from about 1 μm to about 30 μm. In some embodiments, the carbonaceous substrate may have an average particle diameter of from about 5 μm to about 25 μm, and in some other embodiments, may be from about 10 μm to about 20 μm.

In some embodiments, the carbonaceous substrate may serve as a support for the nanostructure disposed thereon, and suppress a volumetric change of the nanostructure during charging/discharging. In some embodiments, the nanostructure includes a metal/semi-metal. In some embodiments, the carbonaceous substrate may include pores. In some embodiments, the pores in the carbonaceous substrate may further effectively suppress a volumetric change of the metal/semi-metal nano structure during charging/discharging.

Some embodiments provide an anode including a composite anode active material as disclosed an described herein. In some embodiments, the anode may be manufactured by molding an anode active material composition including the composite anode active material and a binder into a desired shape, by coating the anode active material composition on a current collector such as a copper foil, or the like.

In some embodiments, the composite anode active material, a conducting agent, a binder, and a solvent may be mixed to prepare the anode active material composition. In some embodiments, the anode active material composition may be directly coated on a metallic current collector to prepare an anode plate. In some embodiments, the anode active material composition may be cast on a separate support to form an anode active material film, which may then be separated from the support and laminated on a metallic current collector to prepare an anode plate. The anode is not limited to the examples described above, and may be one of a variety of types.

In some embodiments, the anode active material composition may further include another carbonaceous anode active material, in addition to the composite anode active material. For example, the carbonaceous anode active material may at least one selected from the group consisting of natural graphite, artificial graphite, expanded graphite, graphene, carbon black, fullerene soot, carbon nanotubes, and carbon fiber, but is not limited thereto, and may be any carbonaceous substrate available in the art.

Non-limiting examples of the conducting agent are acetylene black, ketjen black, natural graphite, artificial graphite, carbon black, carbon fiber, and metal powder and metal fiber of, for example, copper, nickel, aluminum or silver. In some embodiments at least one conducting material such as polyphenylene derivatives may be used in combination. Any conducting agent available in the art may be used. The above-described crystalline carbonaceous materials may be added as the conducting agent.

In some embodiments, the binder may be a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a binding agent in the art may be used.

In some embodiments, the solvent may be N-methyl-pyrrolidone, acetone, or water, but is not limited thereto. Any material available as a solvent in the art may be used.

The amounts of the composite anode active material, the conducting agent, the binder, and the solvent are those levels that are generally used in manufacturing a lithium battery. At least one of the conducting agent, the binder and the solvent may not be used according to the use and the structure of the lithium battery.

Some embodiments provide a lithium battery including an anode including an anode active material as disclosed and described herein. In some embodiments, the lithium battery may be manufactured in the following manner.

First, an anode may be prepared according to the above-described anode manufacturing method.

Next, a cathode active material, a conducting agent, a binder, and a solvent may be mixed to prepare a cathode active material composition. The cathode active material composition may be directly coated on a metallic current collector and dried to prepare a cathode plate. Alternatively, the cathode active material composition may be cast on a separate support to form a cathode active material film, which may then be separated from the support and laminated on a metallic current collector to prepare a cathode plate.

In some embodiments, the cathode active material may include at least one selected from the group consisting of lithium cobalt oxide, lithium nickel cobalt manganese oxide, lithium nickel cobalt aluminum oxide, lithium iron phosphorous oxide, and lithium manganese oxide. The cathode active material is not limited to these examples, and may be any cathode active material available in the art.

In some embodiments, the cathode active material may be a compound selected from the group consisting of $Li_aA_{1-b}B^1{}_bD^1{}_2$ (where $0.90 \le a \le 1.8$, and $0 \le b \le 0.5$); $Li_aE_{1-b}B^1{}_bO_{2-c}D^1{}_c$ (where $0.90 \le a \le 1.8$, $0 \le b \le 0.5$, and $0 \le c \le 0.05$); $LiE_{2-b}B^1{}_bO_{4-c}D^1{}_c$ (where $0 \le b \le 0.5$, and $0 \le c \le 0.05$); $Li_aNi_{1-b-c}Co_bB^1{}_cD^1{}_\alpha$ (where $0.90 \le a \le 1.8$, $0 \le b \le 0.5$, $0 \le c \le 0.05$, and $0 < \alpha \le 2$); $Li_aNi_{1-b-c}Co_bB^1{}_cO_{2-\alpha}F^1{}_\alpha$ (where $0.90 \le a \le 1.8$, $0 \le b \le 0.5$, $0 \le c \le 0.05$, and $0 < \alpha < 2$); $Li_aNi_{1-b-c}Co_bB^1{}_xO_{2-\alpha}F^1{}_2$ (where $0.90 \le a \le 1.8$, $0 \le b \le 0.5$, $0 \le c \le 0.05$, and $0 < \alpha < 2$); $Li_aNi_{1-b-c}Mn_bB^1{}_cD^1{}_\alpha$ (where $0.90 \le a \le 1.8$, $0 \le b \le 0.5$, $0 \le c \le 0.05$, and $0 < \alpha \le 2$);

$Li_aNi_{1-b-c}Mn_bB^1{}_cO_{2-\alpha}F^1{}_\alpha$ (where $0.90 \le a \le 1.8$, $0 \le b \le 0.5$, $0 \le c \le 0.05$, and $0 < \alpha < 2$);
$Li_aNi_{1-b-c}Mn_bB^1{}_cO_{2-\alpha}F^1{}_2$ (where $0.90 \le a \le 1.8$, $0 \le b \le 0.5$, $0 \le c \le 0.05$, and $0 < \alpha < 2$);
$Li_aNi_bE_cG_dO_2$ (where $0.90 \le a \le 1.8$, $0 \le b \le 0.9$, $0 \le c \le 0.5$, and $0.001 \le d \le 0.1$);
$Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$);
$Li_aNiG_bO_2$ (where $0.90 \le a \le 1.8$, and $0.001 \le b \le 0.1$);
$Li_aCoG_bO_2$ (where $0.90 \le a \le 1.8$, and $0.001 \le b \le 0.1$);
$Li_aMnG_bO_2$ (where $0.90 \le a \le 1.8$, and $0.001 \le b \le 0.1$);
$Li_aMn_2G_bO_4$ (where $0.90 \le a \le 1.8$, and $0.001 \le b \le 0.1$);
$QO_2$; $QS_2$; $LiQS_2$; $V_2O_5$; $LiV_2O_5$; $LiI^1O_2$; $LiNiVO_4$; $Li_{(3-f)}J_2(PO_4)_3 (0 \le f \le 2)$;
$Li_{(3-f)}Fe_2(PO_4)_3 (0 \le f \le 2)$; and $LiFePO_4$.

In the formulae above, A is selected from the group consisting of nickel (Ni), cobalt (Co), manganese (Mn), and combinations thereof; $B^1$ is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ is selected from the group consisting of oxygen (O), fluorine (F), sulfur (S), phosphorus (P), and combinations thereof; E is selected from the group consisting of cobalt (Co), manganese (Mn), and combinations thereof; $F^1$ is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; $I^1$ is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

In some embodiments, the compounds listed above as positive active materials may have a surface coating layer (hereinafter, "coating layer"). In some embodiments, a mixture of a compound without having a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. In some embodiments, the coating layer may be formed using any method that do not adversely affect the physical properties of the cathode active material when a compound of the coating element is used. For example, the coating layer may be formed using a spray coating method, a dipping method, or the like.

In some embodiments, the cathode active material may be $LiNiO_2$, $LiCoO_2$, $LiMn_xO_{2x}$ (x=1, 2), $LiNi_{1-x}Mn_xO_2$ ($0 \le x \le 1$), $LiNi_{1-x-y}Co_xMn_yO_2$ ($0 \le x \le 0.5$, $0 \le y \le 0.5$), $LiFeO_2$, $V_2O_5$, TiS, or MoS.

In some embodiments, the conducting agent, the binder and the solvent used for the cathode active material composition may be the same as those used for the anode active material composition. In some embodiments, a plasticizer may be further added into the cathode active material composition or the anode active material composition to form pores in the electrode plates. In some embodiments, a plasticizer may be further added into the cathode active material composition and the anode active material composition to form pores in the electrode plates.

The amounts of the cathode electrode active material, the conducting agent, the binder, and the solvent are those levels that are generally used to the manufacture of a lithium battery. At least one of the conducting agent, the binder and the solvent may not be used according to the use and the structure of the lithium battery.

Next, a separator to be disposed between the cathode and the anode is prepared. In some embodiments, the separator may be any separator that is commonly used for lithium batteries. In some embodiments, the separator may have low resistance to migration of ions in an electrolyte and have an excellent electrolyte-retaining ability. Examples of the separator are glass fiber, polyester, polyethylene, polypropylene, polytetrafluoroethylene (PTFE), and a combination thereof, each of which may be a non-woven or woven fabric. For example, a rollable separator including polyethylene or polypropylene may be used for a lithium ion battery. In some embodiments, a separator with a good organic electrolyte solution-retaining ability may be used for a lithium ion polymer battery. For example, the separator may be manufactured in the following manner.

In some embodiments, a polymer resin, a filler, and a solvent may be mixed together to prepare a separator composition. In some embodiments, the separator composition may be directly coated on an electrode, and then dried to form the separator. In some embodiments, the separator composition may be cast on a support and then dried to form a separator film, which may then be separated from the support and laminated on an electrode to form the separator.

In some embodiments, the polymer resin used to manufacture the separator may be any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate and a mixture thereof.

Next, an electrolyte is prepared. In some embodiments, the electrolyte may be an organic electrolyte solution. In some embodiments, the electrolyte may be in a solid phase. Non-limiting examples of the electrolyte are lithium oxide and lithium oxynitride. Any material available as a solid electrolyte in the art may be used. In some embodiments, the solid electrolyte may be formed on the anode by, for example, sputtering.

In some embodiments, the organic electrolyte solution may be prepared by dissolving a lithium salt in an organic solvent.

The organic solvent may be any solvent available as an organic solvent in the art. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

In some embodiments, the lithium salt may be any material available as a lithium salt in the art. In some embodiments, the lithium salt may be LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiAlO$_2$, LiAlCl$_4$, LiN(C$_x$F$_{2x+1}$SO$_2$)(C$_y$F$_{2y+1}$SO$_2$) (wherein x and y are each independently a natural number of 1 to 20, respectively), LiCl, LiI and a mixture thereof.

Referring to FIG. 4, a lithium battery 1 includes a cathode 3, an anode 2, and a separator 4. The cathode 3, the anode 2 and the separator 4 are wound or folded, and then sealed in a battery case 5. Then, the battery case 5 is filled with an organic electrolyte solution and sealed with a cap assembly 6, thereby completing the manufacture of the lithium battery 1. The battery case 5 may be a cylindrical type, a rectangular type, or a thin-film type. In some embodiments, the lithium battery may be a thin-film type battery. In some embodiments, the lithium battery may be a lithium ion battery.

In some embodiments, the separator may be interposed between the cathode and the anode to form a battery assembly. Alternatively, the battery assembly may be stacked in a bi-cell structure and impregnated with the electrolyte solution. In some embodiments, the resultant may be put into a pouch and hermetically sealed, thereby completing the manufacture of a lithium ion polymer battery.

In some embodiments, a plurality of battery assemblies may be stacked to form a battery pack, which may be used in any device that operates at high temperatures and requires high output, for example, in a laptop computer, a smart phone, electric vehicle, and the like.

In some embodiments, the lithium battery may have improved high rate characteristics and lifetime characteristics, and thus may be applicable in an electric vehicle (EV), for example, in a hybrid vehicle such as plug-in hybrid electric vehicle (PHEV).

Some embodiments provide a method of preparing the composite anode active material includes: mixing a composite material, a catalyst, and a solvent to prepare a first solution; mixing a metal alkoxide and a solvent to prepare a second solution; dropwise adding the second solution to the first solution while stirring the first solution to prepare a mixed solution; washing and drying the mixed solution to obtain a dried product; and heating the dried product, wherein the composite material includes a carbonaceous substrate; and a nanostructure disposed on the substrate.

In some embodiments, the metal alkoxide may be changed into metal oxide by a catalyst in the first solution, so that a reaction on the nanostructure of the composite may be facilitated to form a coating layer preferentially or selectively on the nanostructure when the second solution is dropwise added to the first solution. In some embodiments, the nanostructure includes a metal/semi-metal.

In some embodiments, the catalyst may be at least one selected from the group consisting of KOH, NaOH, LiOH, NH$_4$OH, and Ca(OH)$_2$, but is not limited thereto. For example, any available catalyst releasing OH$^-$ ions to change a condition of the solution into alkali may be used.

In some embodiments, the metal alkoxide may be a sol of an organic metal compound with alkoxide coordinated to metal ions. In some embodiments, the metal alkoxide may be prepared by refluxing a mixture of, for example, about 1 to 10 parts by weight of a metal salt with 100 parts by alcohol, but may be any method known in the art, not limited to the method.

In some embodiments, the first solution may be stirred while the second solution is dropwise added to the first solution. While the first solution is stirred, the second solution may be added to the first solution for about 30 minutes to about 60 minutes. In some embodiments, the mixed solution may be stirred further for about 0.5 hour to about 2 hours after the dropwise addition of the second solution is completed to afford the metal oxide product.

In some embodiments, the metal oxide product may be separated from the mixed solution through a filter, washed with water, ethanol, or the like, and then dried at a temperature of about 80° C. to about 120° C. for about 10 to about 50 minutes to obtain a dried metal oxide product.

According to the preparation method, a weight ratio of the metal alkoxide to the complex in the mixed solution after the adding of the second solution may be from about 0.1:100 to about 20:100. When the amount of the metal alkoxide is too low, a coating effect of the metal alkoxide may be negligible. When the amount of the metal alkoxide is too high, this may lead to reduced specific capacity.

In the preparation method, a metal of the metal alkoxide may be at least one selected from the group consisting of Zr, Ni, Co, Mn, B, Mg, Ca, Sr, Ba, V, Fe, Cu, and Al.

In some embodiments, the metal alkoxide may be represented by Formula 2 below:

$$M(OR)_x. \qquad \text{Formula 2}$$

In Formula 2,
x may be 1, 2, 3, 4, or 5;
M may be selected from the group consisting of Zr, Ni, Co, Mn, B, Mg, Ca, Sr, Ba, Ti, V, Fe, Cu, and Al; and
R maybe C$_{1-10}$ alkyl.

In the preparation method, the solvent may be at least one selected from the group consisting of water, methanol, ethanol, isopropyl alcohol, and a mixture thereof, but is not limited thereto. Any solvent available in the art that may achieve the purpose of the preparation method may be used.

In the preparation method, the heating of the dried product may be performed under a nitrogen or air atmosphere at a temperature of from about 400° C. to about 900° C. for from about 8 hours to about 15 hours. When the heating temperature is too low, unreacted residues may remain as impurities. When the heating temperature is too high, a reaction of carbon in graphite with oxygen in the metal oxide may occur.

In some embodiments, the preparation method may further include grinding a heated product from the heating operation to form a composite anode active material powder.

Hereinafter, one or more embodiments of the present disclosure will be described in detail with reference to the following examples. However, these examples are not intended to limit the scope of the one or more embodiments of the present disclosure.

Preparation of Composite Core

Preparation Example 1

Si nanowires (SiNW) were grown on spherical graphite using a vapor-liquid-solid (VLS) growing method. The spherical graphite used was spherical natural graphite (available from Hitachi Chemical Co.) having an average diameter of about 10 μm. After applying an Ag catalyst on a surface of the spherical graphite, SiH$_4$ gas was flowed at a temperature of about 500° C. or greater to grow Si nanowires thereon, thereby preparing a composite anode active material.

Particles of the spherical graphite were taken, and analyzed using FPIA-3000 to measure circularities. As a result, the spherical graphite particles had a circularity ranging from about 0.808 to about 1.000 as follows. Circularity: 0.808, 0.844, 0.861, 0.878, 0.879, 0.883, 0.884, 0.888, 0.891, 0.892, 0.907, 0.908, 0.913, 0.914, 0.916, 0.918, 0.922, 0.923, 0.924, 0.928, 0.929, 0.934, 0.935, 0.937, 0.938, 0.939, 0.942, 0.943, 0.946, 0.946, 0.947, 0.948, 0.949, 0.952, 0.956, 0.959, 0.961, 0.962, 0.963, 0.963, 0.963, 0.964, 0.964, 0.966, 0.967, 0.967, 0.970, 0.972, 0.976, 0.977, 0.977, 0.977, 0.979, 0.979, 0.982, 0.983, 0.984, 0.986, 0.990, 0.994, 0.995, 0.996, 1.000, 1.000

Figure 3:
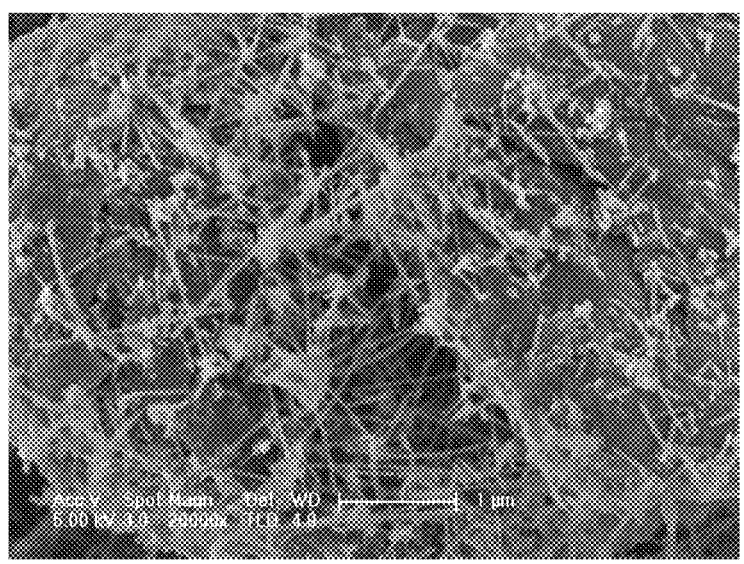
FIG. 3 is a scanning electron microscopic (SEM) image of a composite anode active material prepared in Comparative Example 1.

FIG. 3 is a field emission-scanning electron microscopic (FE-SEM) image of the composite core.

The composite core includes porous particles with pores with a porosity of about 25 volume % based on a total volume of the composite core. The grown Si-nanowires had an average diameter of from about 30 nm to about 50 nm and an average length of about 1.5 μm. A content of the Si nanowires in the composite core was about 8.0 wt % based on a total weight of the composite core.

Preparation of Composite Anode Active Material

Reference Example 1

Figure 2:
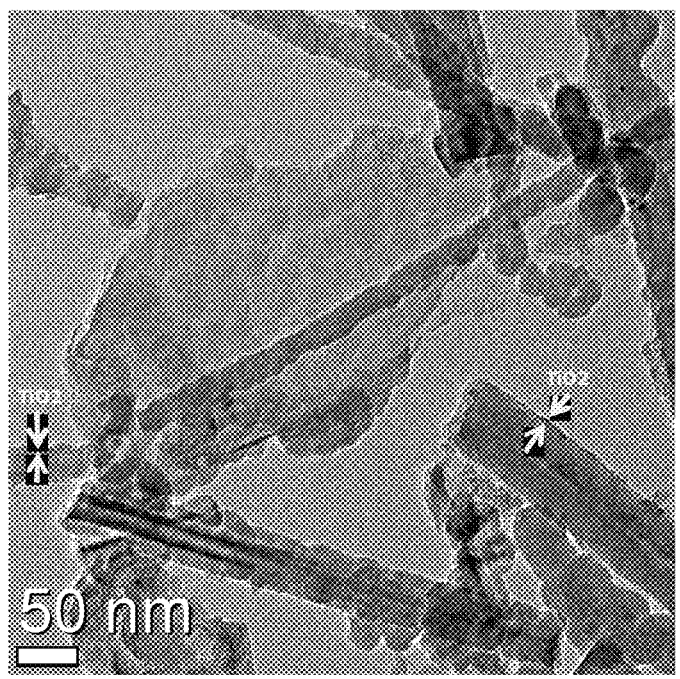
FIG. 2 is a TEM image of a composite anode active material prepared in Reference Example 1.

The composite core powder (25 g) prepared in Preparation Example 1, and 2.1 g of titanium isopropoxide [(Ti(OCH(CH$_3$)$_2$)$_4$, Product No. 205273, available from Aldrich, St. Louis, Mo.], were added to 200 mL of isopropyl alcohol and mixed together to afford a mixture. The solvent was removed from the agitated mixture stirring at about 300 rpm by heating to about 100° C. to afford a dried powder. The dried powder was sintered at about 600° C. for 1 hour under a nitrogen atmosphere to obtain a sintered product. The heated product was ground to afford a composite anode active material with a complex core coated with titanium dioxide. FIG. 2 is a transmission electron microscopic (TEM) image of the composite cathode active material according to Reference Example 1.

Example 1

The composite core powder prepared in Preparation Example 1 (25 g) was added to isopropyl alcohol (200 mL) and mixed at about 60° C. to afford a mixture. Subsequently, the mixture was treated with a KOH solution (1 mL, 2 g of KOH dissolved in 100 mL of H$_2$O) to afford a first solution.

A second solution was prepared by adding 2.1 g of titanium isopropoxide [(Ti(OCH(CH$_3$)$_2$)$_4$, Product No. 205273, available from Aldrich) to 50 mL of isopropyl alcohol (50 mL) with mixing.

The first solution was stirred at about 300 rpm, and then the second solution was dropwise added thereto at a rate of about 1 mL/min over about 50 minutes. The resulting mixture was stirred for about 1 hour to afford a crude product mixture.

The crude product mixture was then filtered, washed with ethanol and then with water to obtain a reaction product. The reaction product was dried at about 110° C. for about 30 minutes to obtain a dried powder. The dried powder was sintered at about 600° C. for 1 hour under a nitrogen atmosphere to obtain a heated product. The sintered product was ground to obtain a composite anode active material with a complex core coated with titanium dioxide. FIG. 1 is a transmission electron microscopic (TEM) image of the composite anode active material according to Example 1.

Example 2

A composite anode active material was prepared in the same manner as in Example 1, except that 2.55 g of aluminum isopropoxide [(Al[OCH(CH$_3$)$_2$]$_3$), Product No. 220418, available from Aldrich), instead of 2.1 g of titanium isopropoxide, was used.

Example 3

A composite anode active material was prepared in the same manner as in Example 1, except that 0.42 g of titanium isopropoxide, instead of 2.1 g of titanium isopropoxide, was used.

Example 4

A composite anode active material was prepared in the same manner as in Example 1, except that 0.51 g of aluminum isopropoxide, instead of 2.1 g of titanium isopropoxide, was used.

Example 5

A composite anode active material was prepared in the same manner as in Example 1, except that 4.2 g of titanium isopropoxide, instead of 2.1 g of titanium isopropoxide, was used.

Example 6

A composite anode active material was prepared in the same manner as in Example 1, except that 5.1 g of aluminum isopropoxide, instead of 2.1 g of titanium isopropoxide, was used.

Comparative Example 1

The composite core prepared in Preparation Example 1 was used as the anode active material. FIG. 3 is a scanning electron microscope (SEM) image of the composite core prepared in Preparation Example 1.

Manufacture of Anode and Lithium Battery

Example 7

A first mixture including the composite anode active material of Example 1 and graphite powder in a weight ratio of 25:75, and a second mixture including a binder of styrene butadiene rubber (SBR) and carboxymethyl cellulose (CMC) in a weight ratio of about 1:1 were mixed in a weight ratio of about 98:2 to prepare an anode active material slurry.

The anode active material slurry was coated in an amount of about 9 mg/cm$^2$ on a copper foil current collector having a thickness of about 10 μm. The anode plate was dried at about 120° C. for about 15 minutes after coating, and was then pressed to prepare an anode.

In order to manufacture a cathode, LCO(LiCoO$_2$) as a cathode active material, carbon black as a conducting agent, and polyvinylidene fluoride (PVdF) as a binder were mixed in a weight ratio of about 97.5:1:1.5 to prepare a cathode active material slurry.

This cathode active material slurry was coated in an amount of about 18 mg/cm2 on an aluminum foil current collector having a thickness of about 12 μm. The cathode plate after the coating was dried at about 120° C. for about 15 minutes, and was then pressed to prepare a cathode.

A polyethylene separator (STAR 20, available from Asahi), and an electrolyte solution including 1.15M LiPF$_6$ dissolved in a mixed solvent of ethylenecarbonate (EC), ethylmethylcarbonate (EMC) and diethylcarbonate (DEC) in a volume ratio of 3:3:4 were used.

Examples 8-12

Lithium batteries were manufactured in the same manner as in Example 7, except that the composite anode active materials prepared in Examples 2 to 6 were respectively used.

Comparative Example 2

A lithium battery was manufactured in the same manner as in Example 7, except that the anode active material of Comparative Example 1 was used.

Evaluation Example 1

TEM Analysis

TEM analysis was performed on the composite anode active material powder prepared in Reference Example 1 and Example 1. The results are shown in FIGS. 1 and 2.

Referring to FIGS. 1 and 2, the $TiO_2$ coating layer on the Si nanowires in the composite anode active material of Example 1 was thicker as compared with that of Reference Example 1.

Therefore, in the composite anode active material of Example 1, $TiO_2$ was coated more preferentially on the Si nanowires than on the carbonaceous substrate as compared with Reference 1.

Evaluation Example 2

Energy-Dispersive X-Ray Spectroscopy (EDAX)

Figure 4A:
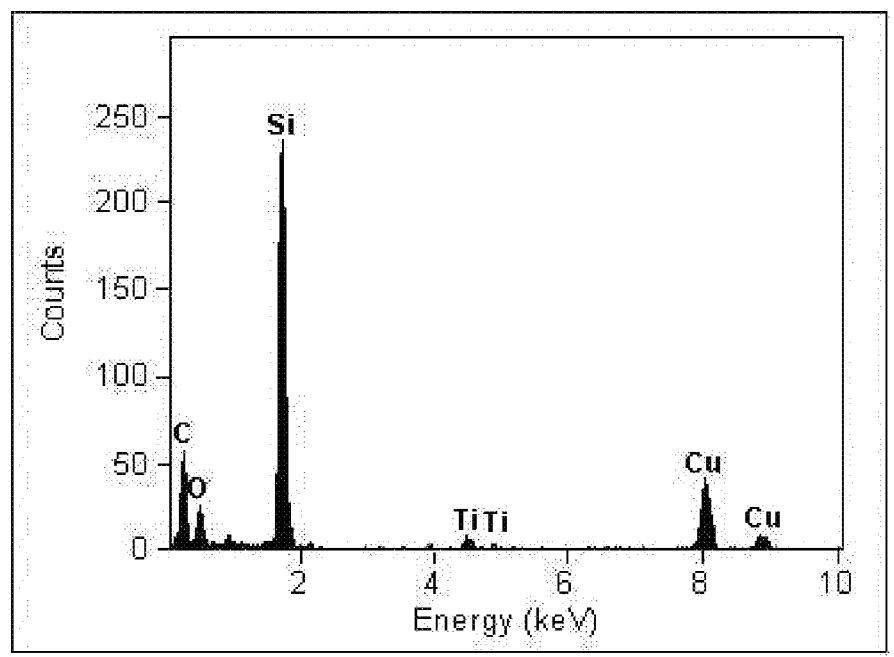
FIG. 4A is an energy dispersive X-ray (EDAX) spectrum of the composite anode active material prepared in Reference Example 1.
Figure 4B:
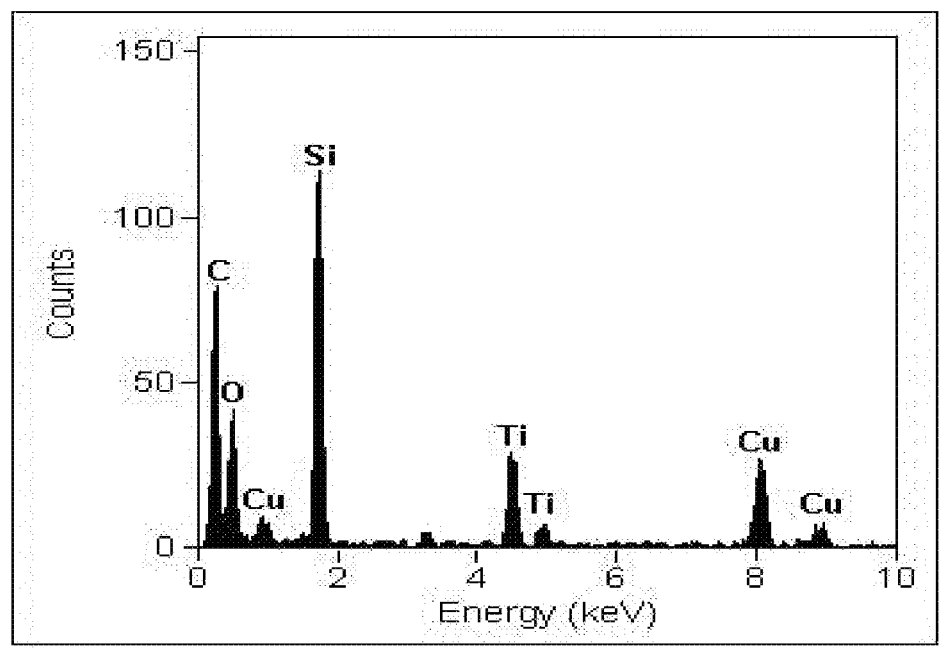
FIG. 4B is an EDAX spectrum of the composite anode active material prepared in Example 1.
Figure 5:
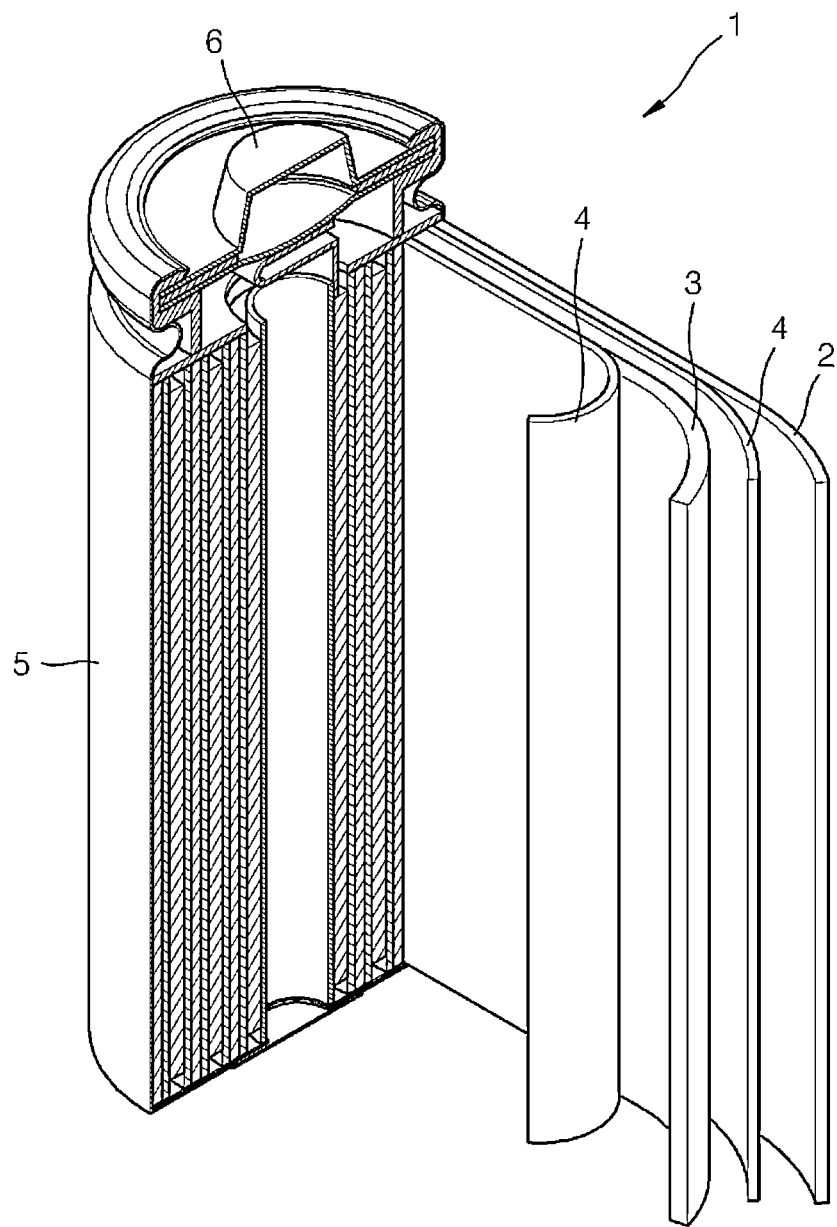
FIG. 5 is a schematic view of a lithium battery according to an embodiment of the present invention.

The composite anode active material powders prepared in Reference Example 1 and Example 1 were analyzed using energy-dispersive X-ray spectroscopy (EDAX). The results are shown in FIGS. 4A, 4B, and Table 1.

TABLE 1

|  | Element | Weight (%) | Atomic (%) |
|---|---|---|---|
| Example 1 | C(K) | 61.346 | 76.770 |
|  | O(K) | 10.666 | 10.020 |
|  | Si | 19.992 | 10.09 |
|  | Ti(K) | 7.994 | 2.508 |
| Reference Example 1 | C(K) | 37.474 | 56.855 |
|  | O(K) | 6.313 | 7.191 |
|  | Si | 54.274 | 35.215 |
|  | Ti(K) | 1.937 | 0.737 |

Referring to Table 1, the composite anode active material of Example 1 had a ratio (A/B) of Si atom % (A) to Ti atom % (B) of about 4.3, while that of the composite anode active material of Reference Example 1 was about 45.6. Therefore, according to the composite anode active material of Example 1, the amount of $TiO_2$ coated on the Si nanostructure was significantly thicker as compared with Reference Example 1. Example 1 and Reference Example 1 both use the same amount of titanium isopropoxide in the coating step. It has surprisingly been found that the method of Example 1 provides a composite anode active material where the amount of $TiO_2$ coated on the Si nanostructure was significantly thicker as compared the amount of $TiO_2$ coated on the Si nanostructure provided by the method of Reference Example 1.

Evaluation Example 3

Evaluation of Room-Temperature Lifetime Characteristics

The coin cells of Examples 7-12 and Comparative Example 2 were each charged with a constant current of 0.2 C rate at about 25° C. until the voltage of the cell reached about 4.3V, and then at a constant voltage of about 4.3V until the current reached 0.05 C. Afterward, the cell was discharged at a constant current of 0.5 C until the voltage reached 2.75V.

Subsequently, each of the cells was charged with a constant current of 0.5 C rate until the voltage of the cell reached about 4.3V, and then at a constant voltage of about 4.3V until the current reached 0.05 C, followed by discharging with a constant current of 0.5 C until the voltage reached about 2.75V (formation process).

Subsequently, each of the cells after the formation process was charged with a constant current of 1.5 C rate at about 25° C. until the voltage of the cell reached about 4.3V, and then at a constant voltage of about 4.3V until the current reached 0.05 C, followed by discharging with a constant current of about 1.0 C until the voltage reached about 2.75V. This cycle of charging and discharging was repeated 20 times.

The results of the charging/discharging test are shown in part in Table 2 below. A capacity retention rate was represented by Equation 1 below.

$$\text{Charge/discharge efficiency}(\%) = [\text{Discharge capacity}/\text{Charge capacity}] \times 100 \quad \text{Equation 1}$$

$$\text{Capacity retention rate}(\%) = [\text{Discharge capacity at } 20^{th}\text{-cycle}/\text{Discharge capacity at } 1^{st} \text{ cycle}] \times 100 \quad \text{Equation 2}$$

TABLE 2

|  | Charge/discharge efficiency at $1^{st}$ cycle [%] | Capacity retention rate at $20^{th}$ cycle [%] | Discharge capacity at $20^{th}$ cycle [mAh/g] |
|---|---|---|---|
| Example 7 | 87.6 | 93.2 | 514.4 |
| Example 8 | 87.2 | 94.3 | 518.0 |
| Example 9 | 89.8 | 91.5 | 517.7 |
| Example 10 | 89.5 | 93.9 | 529.4 |
| Example 11 | 85.7 | 93.1 | 502.6 |
| Example 12 | 85.2 | 92.5 | 496.5 |
| Comparative Example 2 | 87.5 | 92.3 | 508.8 |

Referring to Table 2, most of the lithium batteries of Examples 7-12 were found to have improved room-temperature lifetime characteristics as compared with the lithium battery of Comparative Example 2. The lithium batteries of Examples 1 to 6 were found to have improved discharge capacities relative to a theoretical discharge capacity of about 372 mAh/g for graphite.

Evaluation Example 4

Evaluation of High-Temperature Lifetime Characteristics

A charging/discharging test was performed in the same manner as in Evaluation Example 1, except that the charging/discharging temperature was varied to about 45° C.

The results of the high-temperature charging/discharging test are shown in part in Table 3 below.

TABLE 3

|  | Charge/discharge efficiency at $1^{st}$ cycle [%] | Capacity retention rate at $20^{th}$ cycle [%] | Discharge capacity at $20^{th}$ cycle [mAh/g] |
|---|---|---|---|
| Example 7 | 87.5 | 87.1 | 491.6 |
| Example 8 | 88.2 | 87.4 | 497.2 |
| Example 9 | 88.6 | 84.2 | 481.2 |

TABLE 3-continued

|  | Charge/discharge efficiency at 1st cycle [%] | Capacity retention rate at 20th cycle [%] | Discharge capacity at 20th cycle [mAh/g] |
|---|---|---|---|
| Example 10 | 88.8 | 85.3 | 488.6 |
| Example 11 | 86.6 | 89.5 | 500.0 |
| Example 12 | 86.1 | 90.1 | 500.4 |
| Comparative Example 2 | 87.0 | 85.1 | 477.5 |

Referring to Table 3, most of the lithium batteries of Examples 7-12 were found to have improved high-temperature lifetime characteristics as compared with the lithium battery of Comparative Example 2. The lithium batteries of Examples 7 to 12 were found to have improved discharge capacities at the 20th cycle relative to the lithium battery of Comparative Example 1.

What is claimed is:

1. A composite anode active material comprising:
    a composite core, wherein said composite core comprises a carbonaceous substrate and a nanostructure having a cross-sectional diameter of from about 1 nm to about 500 nm on the carbonaceous substrate, wherein the nanostructure is nanowires, nanotubes, nanobelts, nanorods, a nanoporous body, or nanotemplates; and
    a coating layer formed on the composite core, wherein said coating layer comprises a metal oxide,
    wherein the coating layer on the nanostructure is thicker than that on the carbonaceous substrate.

2. The composite anode active material of claim 1, wherein the nanostructure includes a metal/semi-metal (A) and the metal oxide includes a metal (B), and a ratio (A/B) of the metal/semi-metal atomic % of the nanostructure to the metal atomic % (B) of the metal oxide, which are obtained by energy-dispersive X-ray spectroscopy (EDAX), is about 20 or less.

3. The composite anode active material of claim 1, wherein the nanostructure comprises an element selected from the group consisting of aluminum (Al), gallium (Ga), indium (In), thallium (Tl), silicon (Si), germanium (Ge), tin (Sn), lead (Pb), antimony (Sb), and bismuth (Bi).

4. The composite anode active material of claim 1, wherein the nanostructure comprises silicon-based nanowires, silicon-based nanotubes, silicon-based nanobelts, silicon-based nanorods, silicon-based nanoporous body, or silicon-based nanotemplates.

5. The composite anode active material of claim 1, wherein the nanostructure comprises silicon-based nanowires.

6. The composite anode active material of claim 1, wherein the carbonaceous substrate comprises at least one component selected from the group consisting of natural graphite, artificial graphite, expanded graphite, graphene, carbon black, and fullerene soot.

7. The composite anode active material of claim 1, wherein the carbonaceous substrate is natural graphite.

8. The composite anode active material of claim 7, wherein the natural graphite is spherical graphite.

9. The composite anode active material of claim 1, wherein the metal oxide comprises at least one metal selected from the group consisting of magnesium (Mg), aluminum (Al), cobalt (Co), potassium (K), sodium (Na), calcium (Ca), titanium (Ti), vanadium (V), tin (Sn), germanium (Ge), gallium (Ga), boron (B), arsenic (As), and zirconium (Zr).

10. The composite anode active material of claim 1, wherein the metal oxide is one or more components selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide.

11. The composite anode active material of claim 1, wherein the metal oxide is $TiO_2$, $Al_2O_3$, or $ZrO_2$.

12. The composite anode active material of claim 1, wherein the ratio of coating layer thickness (A) on the nanostructure and the coating layer thickness (B) on the carbonaceous substrate is greater than 1 to about 100 (A/B).

13. A lithium battery comprising:
    a cathode;
    an anode comprising:
        a composite anode active material comprising:
            a composite core, wherein said composite core comprises a carbonaceous substrate and a nanostructure having a cross-sectional diameter of from about 1 nm to about 500 nm on the carbonaceous substrate, wherein the nanostructure is nanowires, nanotubes, nanobelts, nanorods, a nanoporous body, or nanotemplates; and
            a coating layer formed on the composite core, wherein said coating layer comprises a metal oxide, and the coating layer on the nanostructure is thicker than that on the carbonaceous substrate; and
    a separator disposed between the anode and the cathode.

* * * * *